United States Patent [19]
Stojic

[11] Patent Number: 5,771,774
[45] Date of Patent: Jun. 30, 1998

[54] SPRING BRAKE ACTUATOR HAVING PLASTIC PRESSURE PLATE ASSEMBLY

[75] Inventor: Steven M. Stojic, Holland, Mich.

[73] Assignee: Nai Anchorlok, Inc., Muskegon, Mich.

[21] Appl. No.: 728,096

[22] Filed: Oct. 9, 1996

Related U.S. Application Data

[63] Continuation of PCT/US95/14780 Nov. 14, 1995.

[51] Int. Cl.⁶ .................................................... F01B 19/00
[52] U.S. Cl. .................. 92/98 D; 92/99; 92/128; 92/130 A; 29/888.06
[58] Field of Search ................................ 92/99, 128, 63, 92/98 D, 130 A, 131; 29/888.06

[56] References Cited

U.S. PATENT DOCUMENTS

| | | | |
|---|---|---|---|
| 3,408,899 | 11/1968 | Golden | 92/99 |
| 3,762,280 | 10/1973 | Krueter et al. | 92/98 D |
| 4,043,251 | 8/1977 | Ohmi | 92/99 |
| 4,056,043 | 11/1977 | Sriramamurty et al. | 92/99 |
| 4,069,904 | 1/1978 | Garrett et al. | |
| 4,152,559 | 5/1979 | Davis | |
| 4,803,912 | 2/1989 | Nishii | |
| 5,002,164 | 3/1991 | Bowyer | |
| 5,067,392 | 11/1991 | Gautier | |
| 5,076,142 | 12/1991 | Steer et al. | |

FOREIGN PATENT DOCUMENTS

| | | | |
|---|---|---|---|
| 0 480 148 A2 | 8/1991 | European Pat. Off. | |
| 0 486 824 A1 | 10/1991 | European Pat. Off. | |
| 945287 | 6/1961 | United Kingdom | 92/99 |

OTHER PUBLICATIONS

International Search Report, PCT/US95/14780, Filed Nov. 14, 1995.

*Primary Examiner*—Thomas E. Denion
*Attorney, Agent, or Firm*—Rader, Fishman, Grauer & McGarry

[57] ABSTRACT

An air-operated diaphragm spring brake actuator has a pressure plate formed entirely of plastic. The diaphragm is secured to the pressure plate by ultrasonic welding. The pressure plate also has a central hub which centers the opening and receives the actuator rod in press-fit engagement.

19 Claims, 3 Drawing Sheets

SPRING BRAKE ACTUATOR HAVING PLASTIC PRESSURE PLATE ASSEMBLY

BACKGROUND OF THE INVENTION

1. Related Applications

This application is a continuation of International Application No. PCT/US95/14780, filed Nov. 14, 1995.

2. Field of the Invention

This invention relates to a spring brake actuator and, more particularly, to a spring brake actuator having a plastic pressure plate assembly.

3. Description of the Related Art

An air brake system for a vehicle such as a bus, truck or the like, typically includes a brake shoe and drum assembly which is actuated by means of an actuator assembly operated by the selective application of a fluid such as compressed air. Conventional air brake actuators have both a service brake actuator for actuating the brakes under normal driving conditions by the application of compressed air and an emergency or spring brake actuator which causes actuation of the brakes when air pressure has been released. The emergency brake actuator includes a strong compression spring which forces application of the brake when air is released. This is often referred to as the spring brake. The spring brake actuator can be installed by itself or in tandem with the service brake actuator.

When full pressure is applied to the spring brake actuator, air pressure acting against a diaphragm and a pressure plate compresses the spring. A spring brake actuator rod is either integral with the pressure plate and held in a retracted position by the air pressure or retracted by a return spring. In the event of a loss of air pressure or an intentional exhaustion of air from the spring brake actuator, the brake will be mechanically activated by the force of a strong compression spring acting on the spring brake actuator rod which, in turn, acts upon an attached push rod to apply the brakes. Examples of known spring brake assemblies include U.S. Pat. No. 5,105,727 to Bowyer, issued Apr. 21, 1992, U.S. Pat. No. 3,439,585 to Herrera, issued Apr. 22, 1969; and U.S. Pat. No. 3,842,716 to Swander, Jr., issued Oct. 22, 1974.

A typical spring brake pressure plate assembly comprises a circular, flat plate made of steel or aluminum having a central tubular portion through which the actuator rod is connected. The pressure plate is typically heavy, made of a strong metal to withstand the strong compressive forces placed on the pressure plate while restraining the compression spring. It would be desirable to construct the pressure plate from a lightweight material to reduce the weight of the spring brake actuator which, in turn, would reduce the total weight of the truck and conceivably even reduce the number of parts. Plastic parts have been used in brake boosters which involve much lower pressures than spring brake actuators. See U.S. Pat. Nos. 5,076,142, issued Dec. 31, 1991, and 4,803,912, issued Feb. 14, 1989.

SUMMARY OF THE INVENTION

The spring brake actuator according to the invention overcomes the problems of the prior art by incorporating a plastic pressure plate which is sufficiently strong to withstand the applied forces of the compression spring. The plastic pressure plate provides a weight reduction by the use of plastic as opposed to steel or aluminum and reduces the number of parts in the brake by incorporating the guiding function.

A first embodiment of an emergency brake actuating mechanism comprises a cylindrical housing having a closed end and an open end. A brake housing adapter is lockingly received in the open end of the housing defining a housing interior with an opening centrally disposed in the housing adapter. An elastomeric rolling diaphragm is suspended within the housing and divides the housing into a spring chamber and a pressure chamber. A pressure plate assembly is received in the spring chamber. The pressure plate assembly is reciprocally movable, responsive, in part to the introduction and exhaust of pressurized fluid to the pressure chamber. The pressure plate assembly comprises a plate member having a central tubular portion and a radially extending flange. The central tubular portion of the pressure plate is adapted to receive the actuator rod in press-fit relationship and the radially extending flange fits into a U-shaped annular guide which determines the degree of freedom of the movement of the pressure plate. The pressure plate has on its lower side a plurality of pins which mate with holes in the rolling diaphragm. Disposed underneath the diaphragm is a retainer plate, which also has mating holes for the pressure plate pins so that the diaphragm is retained between the pressure plate and the retainer plate. The retainer plate and diaphragm are fastened to the pressure plate by ultrasonically deforming pins beneath the underside of the retainer plate.

Further according to the invention, a method for making an air-operated spring brake actuator comprises the steps of providing a housing having at one end an end wall and at another end an adapter wall defining a push rod opening, installing a movable diaphragm in the housing to define a spring chamber and a fluid pressure chamber so that the diaphragm is adapted to move between a retracted position and an actuation position, mounting a pressure plate to the diaphragm in the spring chamber, connecting a push rod to the pressure plate so that it extends through the push rod opening for actuating a brake in response to movement of the diaphragm between the retracted position and the actuating position and installing a compression spring in the housing between an end wall and the pressure plate to bias the diaphragm to the extended position. According to the invention, the pressure plate is integrally molded from a synthetic plastic material with a plurality of axially extending pins. Further, the step of mounting the pressure plate to the diaphragm comprises the step of positioning the pins in openings in the diaphragm and inelastically deforming the pins to lock the pressure plate in the diaphragm.

Preferably, the step of mounting the pressure plate to the diaphragm further comprises the step of positioning a retain plate in contact with the diaphragm on a side distal from the pressure plate and positioning the pins through holes in the retainer plate and thereafter inelastically deforming the pins to secure the diaphragm between the retainer plate and the pressure plate.

BRIEF DESCRIPTION OF THE DRAWINGS

The invention will now be described with reference to the drawings in which.

DETAILED DESCRIPTION OF THE PREFERRED EMBODIMENTS

Figure 1:
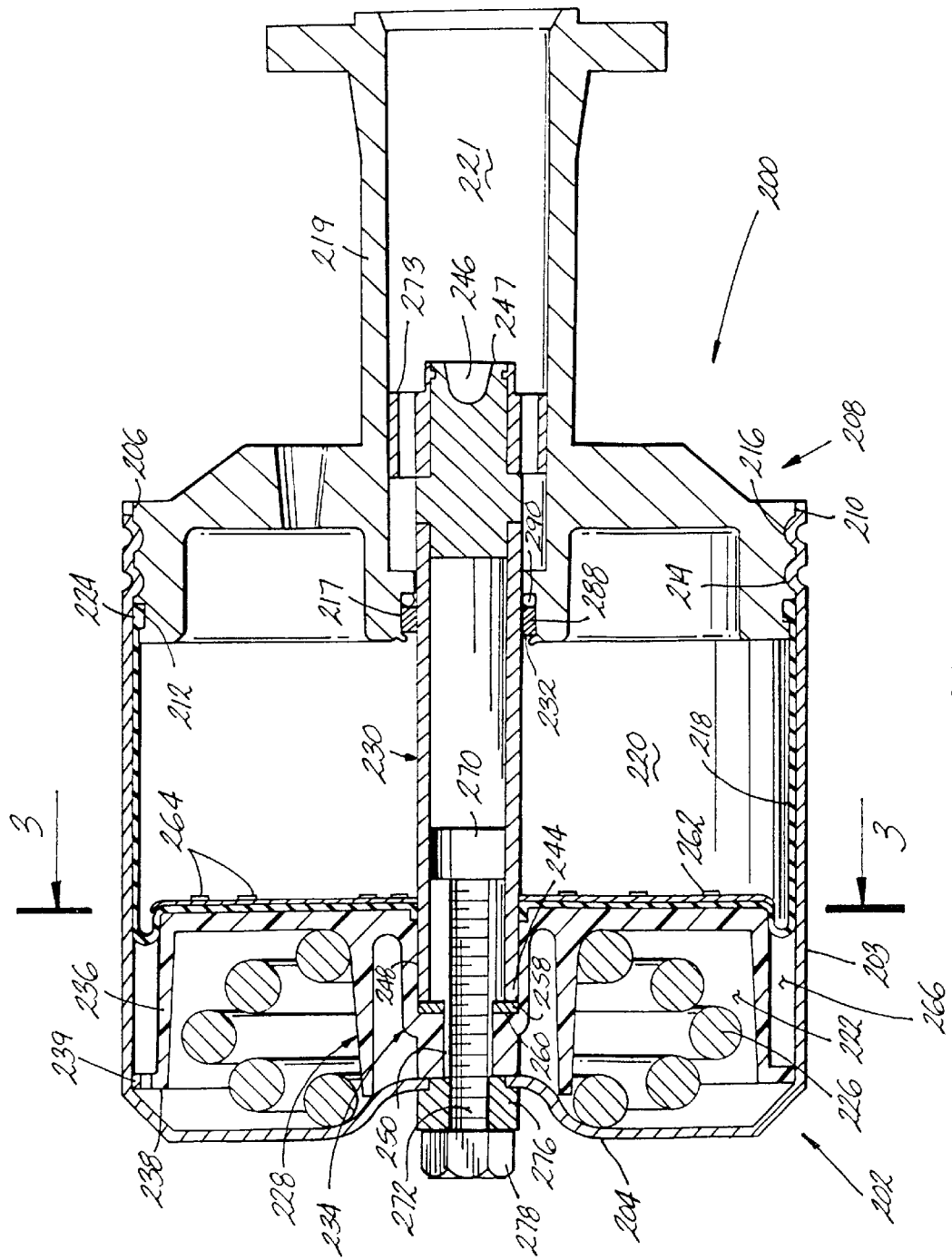
FIG. 1 is a cross-sectional view of an air-operated brake actuating assembly having a plastic pressure plate according to the invention.

Referring to the drawings and to FIG. 1, in particular, a first embodiment of a parking brake 200 for attachment to an existing braking system in a vehicle (not shown) to provide emergency and parking brake service is shown. The spring brake actuator 200 comprises a cylindrical head 202 formed of steel and having a cylindrical portion 203, an end wall 204 and an opposite open end 206. A cast aluminum or steel adapter 208 is received within the head open end 206. The adapter 208 has an annular outer wall 210 bearing three annular grooves 212, 214 and 216 and a portion of the head 202 is deformed into the two outermost annular grooves 214 and 216 to permanently secure the head 202 to the adapter 208. The adapter 208 has a central tubular guide 219 which has an internal bore 221.

A rolling diaphragm 218 divides the interior chamber of the brake actuator 200 into a pressure chamber 220 and a spring chamber 222. The shape of the diaphragm 218 is generally tubular with one end terminating in an annular bead 224. The innermost annular groove 212 receives the annular bead 224 so that the diaphragm 218 is held between the adapter 208 and the head 202 in a sealing relationship. A plastic pressure plate 228 is attached to the diaphragm 218 in the spring chamber 222. A strong compression spring 226 extends between the head end wall 204 and the pressure plate 228, providing a bearing surface for the spring 226. A hollow actuator rod 230 is press-fit onto the pressure plate 228 and extends out of the pressure chamber 220 through an opening 232 in the adapter 208. A bearing 288 and O-ring 290 are mounted in an annular groove 217 of the adpator 208 to guide and seal the actuator rod 230 as it passes through an opening 232 to provide an airtight seal between the actuator rod 230 and the adapter 208.

Figure 3:
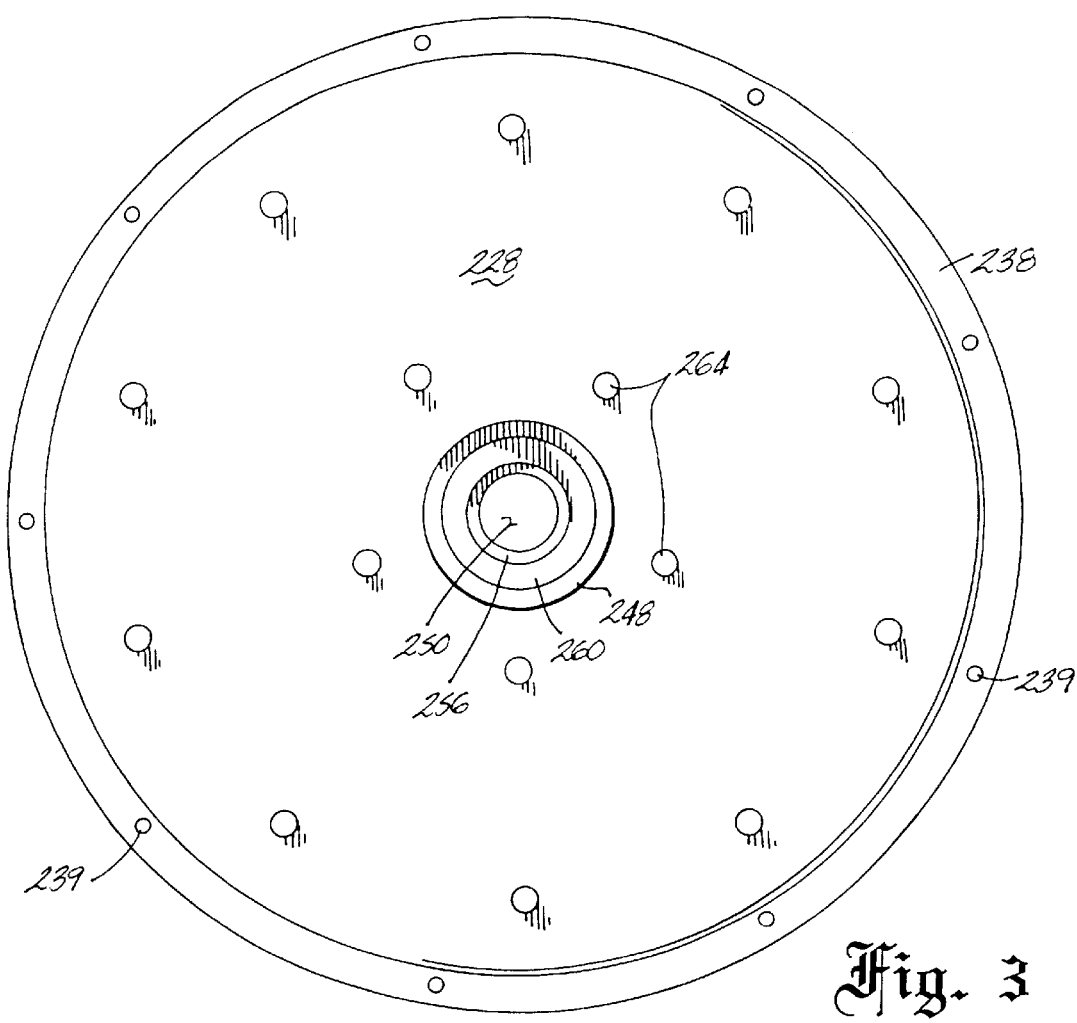
FIG. 3 is a bottom plan view of the plastic pressure plate shown in FIG. 2.
Figure 2:
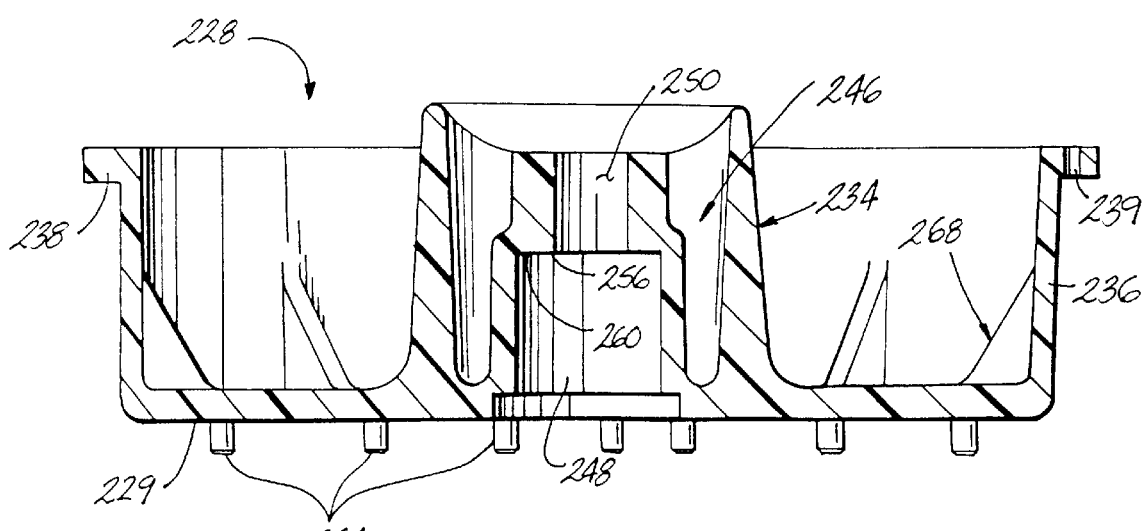
FIG. 2 is an elevational view in section of a first embodiment of the plastic pressure plate according to the invention shown in FIG. 1.

Referring to FIGS. 1–3, the pressure plate 228 has a flat plate portion 229, a central tubular flange 234 and an inner tubular hub 246 which receives the actuator rod 230. It also has an annular rim 236 which extends axially toward the head end wall 204. The rim 236 terminates in an annular guide flange 238 which extends radially outwardly from the rim 236 toward the cylindrical portion 203 of the head 202. As seen in FIG. 1, the pressure plate return flange 236 is spaced radially inwardly from the cylindrical portion 203 of head 202 to form an annular gap 266. The guide flange 238 has a series of through holes 239 to vent annular gap 266. Flange 238 bears against inside cylindrical portion 203 of head 202 in reciprocal motion. The inner tubular hub 246 defines a first bore 248 which terminates in a shoulder 260 and a second bore 250. The exterior diameter of the inner tubular hub 246 is slightly less at an upper portion which forms the bore 250 than at a lower portion which forms the first bore 248. A plurality of axially extending pins 264 extend from a bottom portion of the flat plate portion 229. Gussets 268 are integrally formed between the annular rim and an upper portion of the flat plate portion 229 to strengthen the annular rim 236.

The actuator rod 230 comprises a proximal end 244 affixed to the pressure plate 228 and a distal end 247 extending from the actuator rod opening 232. The distal end 247 mounts an annular bushing 273. The actuator rod proximal end 244 is received in the pressure plate first bore 248. A steel washer 258 lies against the shoulder 260. The actuator rod proximal end 244 is press fit in the first bore 248, bearing against the washer 258 to hold the washer 258 securely in place.

A disc-shaped retainer plate 262 and the pressure plate 228 sandwich the diaphragm 218 to secure the diaphragm 218 to the pressure plate 228. The pins 264 (FIG. 3), pass through mating holes (not shown) in the rolling diaphragm 218 and the retainer plate 262 and are ultrasonically swaged to the underside of retainer plate 262 to lock the pressure plate 228, rolling diaphragm 218 and retainer plate 262 together. Alternatively, threaded fasteners can be used to join the pressure plate 228, rolling diaphragm 218 and retainer plate 262 together.

The compression spring 226 is nested in the pressure plate 228 between the annular rim 236 and the central tubular flange 234. A collar 276 is mounted to the end wall 204 and has a threaded bore in which is threaded a caging bolt 272. A hex nut 278 is staked onto the outer end of the caging bolt 272 for rotation of the bolt 272 by means of a wrench. A head 270 is formed on the inner end of the bolt 276 to engage the washer 258 and manually retract the diaphragm 218 and pressure plate 228 to compress the spring 226 to release brake pressure if desired, when in the emergency or parking mode.

During normal operation of the brake actuator 200, the actuator rod 230 will be in the fully retracted position, as seen in FIG. 1, by means of compressed air which is maintained in the pressure chamber 220. When the compressed air is exhausted, the compression spring 226 expands to force the pressure plate 228 and integrally attached actuator rod 230 downwardly through the adapter opening 232 to actuate a brake (not shown), in emergency or parking mode. The guide flange 238 and guide 240 guide the movement of the pressure plate 228 as it reciprocates within the head 202. As the pressure plate 228 moves toward the adapter 208, the diaphragm 218 folds over on itself or rolls, so as to be received within the annular gap 266. When the brake is to be released, compressed air is once again introduced in the pressure chamber 220. The force of the compressed air against the rolling diaphragm 218 and retainer plate 262 overcomes the compression force of the spring 226 and returns the pressure plate 228 and actuator rod 230 to the position seen in FIG. 1.

Figure 4:
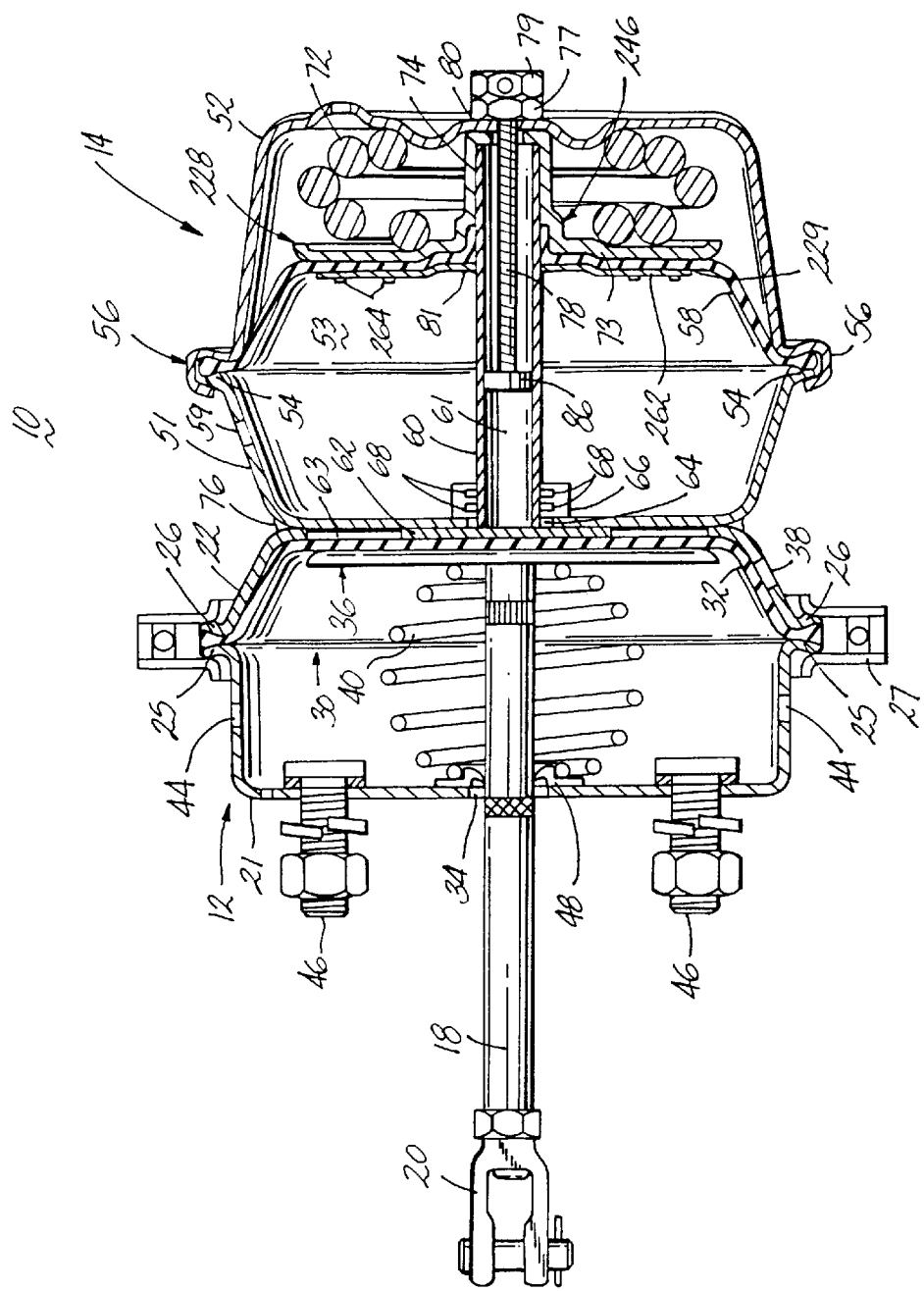
FIG. 4 is a cross-sectional view of a dual-chamber, air-operated spring brake actuator having a plastic pressure plate according to the invention.

Referring to FIG. 4, a second embodiment of the plastic pressure plate is shown in the context of a conventional air-actuated spring brake with an attached service brake is shown in a cross-sectional view of an air-operated brake actuating unit 10. Like numbers are used to identify like parts. The actuating unit 10 comprises a service brake portion 12 mounted in tandem to a spring brake or emergency brake portion 14. A service brake push rod 18 extends from the service brake 12 for reciprocating motion and is provided with a clevis 20 which is adapted for connection to a conventional brake (not shown) in a standard fashion. Reciprocating motion of the push rod 18 by the actuating unit 10 will cause the brake to be alternately applied and released.

The service brake portion 12 comprises a pair of facing cup-shaped housing sections 21, 22, each having an outwardly directed flanged edge 25, 26, respectively. The housing sections 21, 22 are clamped together at their flanged edges by a clamp 27 to form a service brake inner chamber 30. The peripheral edge of an elastomeric diaphragm 32 is captured between the opposed edges 25, 26, of the housing 21, 22 and suspended within the inner chamber 30. The service brake push rod 18 extends through a central aperture 34 in housing section 21 into the service brake chamber 30 where it terminates at a plate 36. A compression spring 40 extends between the plate 36 and the interior surface of the housing section 21. A spring seat 48 is disposed around the central opening 34 to receive the end of the compression spring 40 and retain it in position around the opening 34. The spring 40 urges the plate 36 and the service brake push rod 18 to a fully retracted position as seen in FIG. 4. Mounting studs 46 are provided to the housing section 21 to mount the brake actuating unit 10 onto an appropriate bracket (not shown).

To operate the service brake, compressed air is introduced through an air service port 38 formed in the housing section 22 to force the diaphragm 32 and the plate 36 against the force of the compression of the spring 40 to actuate the push rod 18. Evacuation openings 44 are provided in the housing section 21 to allow for the rapid evacuation of air from the inner chamber 30 as the pressurized air is introduced through the air service port 38.

The spring brake 14 comprises a pair of facing cup-shaped housing sections 51, 52 joined at their edges to define an inner chamber 53. Housing section 51 is provided with an outwardly directed circumferential flanged edge 54 which is received inside of a rolled peripheral edge 56 formed on the housing section 52. An elastomeric diaphragm 58 is suspended within the spring brake chamber 53 and is captured at its peripheral edge between the edges 54, 56 of the opposed housing sections 51, 52. The portion of the chamber 53 between the diaphragm 58 and the housing section 51 forms an air chamber which is filled with compressed air supplied through an air service port 59 in the housing section 51 when the emergency brake is in its normal, released position. An actuator rod 60, aligned with push rod 18, has one end extending through a central aperture 64 formed in the end wall of the housing section 51. This end of the actuator rod 60 terminates in a reaction plate 62 which is received in a central aperture 63 of the end wall of the housing section 22 of the service brake portion 12. The central aperture 64 is provided with a bearing 66 having annular recesses to accommodate a pair of O-rings 68. The bearing 66 forms a bearing surface and an airtight seal for the actuator rod 60.

The other end of the actuator rod 60 extends through a centrally disposed aperture 81 in the diaphragm 58 and terminates in a spring brake pressure plate 228 which engages the spring brake compression spring 72. The spring brake pressure plate 228 is made of plastic and comprises a substantially flat portion 229 engaging one end of the spring 72 and an inner tubular hub 246 extending generally axially along the axis of the spring 72. The inner tubular hub 246 is press-fit onto an end portion of the actuator rod 60 such that the spring brake pressure plate 228 and the rod 60 form an integral unit. As in the first embodiment, the pressure plate 228 includes pins 264 located on a bottom portion of the substantially flat portion 229. To attach the pressure plate to the elastomeric diaphragm 58, the pins 264 pass through mating holes (not shown) in the elastomeric diaphragm and a steel retainer plate 262. The pins 264 are then ultrasonically deformed beneath the underside of retainer plate 262. The purpose of the steel retainer plate 262 is to add structural strength and stiffness to the plastic pressure plate and to aid the retention of the diaphragm inner seal bead 224 in the annular groove 212. Alternatively, the pressure plate 228 can be attached to the elastomeric diaphragm 58 and the retainer plate 262 by threaded fasteners (not shown) which pass through aligned bores in the three components.

During normal operation of the brake 10, the actuator rod 60 will be in the fully withdrawn position, as seen in FIG. 4, by means of compressed air which is maintained in the portion of the chamber 53 defined by the diaphragm 58 and the housing section 51. When the compressed air is exhausted, the compression spring 72, one end of which engages the outer end wall of the housing 52, forces the spring brake pressure plate 228 and integrally attached rod 60 in the direction of the brake push rod 18 of the service brake 12. The housing section 22 of the service brake 12 and housing section 51 of the spring brake 14 are preferably steel shells attached to each other by means of a circumferentially extending weld bead 76 or other suitable attachment means or can be an integral aluminum casting. The force of the spring 72 causes the actuator rod 60 to be extended through the central opening 64 and causes the reaction plate 62 to apply a force to the diaphragm 32 and plate 36 of the service brake. This action causes the service brake push rod 18 to be actuated and the brake to be applied. When the brake is to be released, compressed air is once again introduced in the space between the housing section 51 and diaphragm 58. The force of the compressed air against the diaphragm 58 overcomes the compression force of the spring 72 and returns the pressure plate 228 and rod 60 to the position seen in FIG. 1.

The actuator rod 60 is a hollow tube or rod provided with a central bore 61 to accommodate a brake release or caging bolt 78. The bolt 78 is adapted to engage an end edge 80 of the tubular portion 74 of the spring brake pressure plate 70 to maintain the spring 72 in a compressed position whenever so desired. The bolt 78 may be used to manually release the spring brake or to insure that the compression spring 72 will remain fully compressed when maintenance functions are performed on the brake assembly. The bolt 78 is threaded and engages a fixed, threaded opening in a nut 77 affixed by welding or staking to the end wall of the housing section 52. A second nut or head 79 is fixedly attached to the threaded bolt such that the bolt may be rotated in the nut 77 by a common wrench or the like.

The plastic pressure plate 228 according to the invention provides a sufficiently strong mounting between the elastomeric diaphragm 58 and the retainer plate 262 while providing a reduction in the overall weight of the spring brake actuator.

The plastic pressure plate assembly according to the invention provides significant advantages over the conventional plate assemblies. Any weight reduction in an individual component of a truck is desirable. The spring brake actuator according to the invention provides such a weight savings by including a pressure plate made of lightweight plastic reinforced with a steel retainer plate rather than a solely steel or aluminum pressure plate. The steel retainer plate provides sufficient structural rigidity to prevent deformation of the plastic pressure plate. Further, the plastic pressure plate can be inexpensively manufactured by injection molding. It replaces six parts in a prior rolling lobe brake actuator design.

Reasonable variation and modification are possible within the spirit of the foregoing specification and drawings without departing from the scope of the invention.

I claim:

1. In an air-operated diaphragm spring brake actuator comprising:

a housing having a first end wall and at another end a second end wall defining a push rod opening;

a movable diaphragm in the housing defining a spring chamber and a fluid pressure chamber, the diaphragm adapted to move between a retracted position and an actuation position;

a push rod connected to the diaphragm and extending through the push rod opening for actuating a brake in response to movement of the diaphragm between the retracted position and the actuation position;

a pressure plate mounted to the diaphragms distal to the push rod, and in the spring chamber; and a compression spring mounted in the housing between the first end wall and the pressure plate;

the improvement which comprises:

the pressure plate comprising an integrally molded plastic body.

2. An air-operated diaphragm spring brake actuator according to claim 1 wherein the plastic pressure plate has a flat plate portion with one side in contact with the diaphragm and an opposite side in contact with the compression spring;

a rim extending into the spring chamber from the flat plate portion;

a central tubular flange extending into the spring chamber from the flat plate portion; and the compression spring being housed between the central tubular flange and the rim at least when the diaphragm is in the retracted position.

3. An air-operated diaphragm spring brake actuator according to claim 2 wherein the pressure plate further has an inner tubular hub which telescopingly receives an end of the push rod.

4. An air-operated diaphragm spring brake actuator according to claim 2 wherein the plastic pressure plate further has a plurality of strengthening gussets between the rim and the flat plate portion.

5. An air-operated diaphragm spring brake actuator according to claim 2 and further comprising a guide flange on an outer end of the plastic pressure plate, contacting an inner surface of the housing at least when the diaphragm is in the retracted position for guiding the movement of the pressure plate with respect to the housing.

6. An air-operated diaphragm spring brake actuator according to claim 5 wherein the inner surface of the housing is cylindrical and the guide flange is annular and in contact with the cylindrical inner surface of the housing as the pressure plate reciprocates within the housing.

7. An air-operated diaphragm spring brake actuator according to claim 1 wherein the pressure plate has a flat plate portion with one side in contact with the diaphragm and an opposite side in contact with the compression spring, and a plurality of pins which extend from the flat plate portion through the diaphragm and are inelastically deformed to retain the pressure plate on the diaphragm.

8. An air-operated diaphragm spring brake actuator according to claim 7 and further comprising a retainer plate in contact with the diaphragm on a side distal from the pressure plate and the pins extend through the retainer plate to secure the retainer plate to the diaphragm.

9. An air-operated diaphragm spring brake according to claim 8 wherein the plastic retainer plate further has a rim extending into the spring chamber from the flat plate portion, and a plurality of strengthening gussets between the cylindrical rim and the flat plate portion.

10. A method of making an air-operated diaphragm spring brake actuator comprising the steps of:

providing a housing having at one end an end wall and at another end an adapter wall defining a push rod opening;

installing a movable diaphragm in the housing to define a spring chamber and a fluid pressure chamber so that the diaphragm is adapted to move between a retracted position and an actuation position;

mounting a pressure plate to the diaphragm in the spring chamber;

connecting a push rod to the pressure plate so that it extends through the push rod opening for actuating a brake in response to movement of the diaphragm between the retracted position and the actuation position;

installing a compression spring in the housing between the end wall and the pressure plate to bias the diaphragm to the extended position;

the improvement which comprises:

integrally molding the pressure plate from a synthetic plastic material with a plurality of axially extending pins; and the step of mounting a pressure plate to the diaphragm comprises the step of positioning the pins in openings in the diaphragm and inelastically deforming the pins to lock the pressure plate to the diaphragm.

11. A method according to claim 10 wherein the step of mounting a pressure plate to the diaphragm further comprises the step of positioning a retainer plate in contact with the diaphragm on a side distal from the pressure plate and positioning the pins through holes in the retainer plate and thereafter inelastically deforming the pins to secure the diaphragm between the retainer plate and the pressure plate.

12. An air operated spring brake actuator comprising:

a generally cylindrical housing having at one end a first end wall and at another end, a second end wall, the second end wall having a push rod opening, a unitary plastic pressure plate mounted within the housing for reciprocal movement between a retracted position and an actuating position, a push rod operatively connected to the pressure plate and extending through the push rod opening for actuating a brake in response to movement of the pressure plate toward the actuating position, a rolling lobe diaphragm mounted between the pressure plate and the housing, and a compression spring between the first end wall and the pressure plate.

13. An air-operated spring brake actuator according to claim 12 wherein the pressure plate is cup-shaped with a lip portion.

14. An air-operated spring brake actuator according to claim 13 wherein the lip portion has a guide flange in contact with an inner surface of the housing.

15. An air-operated spring brake actuator according to claim 12 wherein the pressure plate has an inner hub and an outer wall, and the spring is retained between the inner hub and the outer wall.

16. An air-operated spring brake actuator according to claim 15 wherein the push rod is secured to the hub.

17. An air-operated spring brake actuator according to claim 12 wherein the diaphragm is mounted to the pressure plate by pins.

18. An air-operated spring brake actuator according to claim 17 wherein the pins are inelastically deformed to secure the diaphragm to the pressure plate.

19. An air-operated spring brake actuator according to claim 16 wherein the diaphragm is clamped between the push rod and the hub.

* * * * *